US009330469B2

(12) United States Patent
Guan

(10) Patent No.: US 9,330,469 B2
(45) Date of Patent: May 3, 2016

(54) SYSTEMS AND METHODS FOR BOIL DETECTION

(71) Applicant: General Electric Company, Schenectady, NY (US)

(72) Inventor: Li Guan, Clifton Park, NY (US)

(73) Assignee: General Electric Company, Schenectady, NY (US)

(*) Notice: Subject to any disclaimer, the term of this patent is extended or adjusted under 35 U.S.C. 154(b) by 78 days.

(21) Appl. No.: 14/247,381

(22) Filed: Apr. 8, 2014

(65) Prior Publication Data

US 2015/0286891 A1  Oct. 8, 2015

(51) Int. Cl.
*G06K 9/00* (2006.01)
*G06T 7/00* (2006.01)
*G06T 7/20* (2006.01)

(52) U.S. Cl.
CPC .............. *G06T 7/0048* (2013.01); *G06T 7/208* (2013.01); *G06T 2207/10016* (2013.01); *G06T 2207/20081* (2013.01); *G06T 2207/30128* (2013.01)

(58) Field of Classification Search
None
See application file for complete search history.

(56) References Cited

U.S. PATENT DOCUMENTS

| 6,301,521 | B1 | 10/2001 | Chen et al. |
| 7,468,987 | B1* | 12/2008 | Bennett ................. H04J 3/0608 370/465 |
| 8,439,683 | B2 | 5/2013 | Puri et al. |
| 2006/0045354 | A1* | 3/2006 | Hanna .............. G08B 13/19613 382/224 |
| 2006/0221213 | A1* | 10/2006 | Watanabe .............. G02B 7/102 348/240.3 |
| 2008/0219334 | A1* | 9/2008 | Brainos ................. H04L 1/0002 375/221 |
| 2010/0158356 | A1 | 6/2010 | Ranzato et al. |
| 2010/0182136 | A1 | 7/2010 | Pryor |
| 2010/0231506 | A1 | 9/2010 | Pryor |
| 2011/0253693 | A1* | 10/2011 | Lyons .................... A47J 27/00 219/209 |

FOREIGN PATENT DOCUMENTS

| CN | 102121906 | 7/2011 |
| EP | 1 505 350 A2 | 2/2005 |
| JP | 2003307311 | 10/2003 |

* cited by examiner

*Primary Examiner* — Hadi Akhavannik
(74) *Attorney, Agent, or Firm* — Dority & Manning, P.A.

(57) ABSTRACT

Systems and methods for boil detection are provided. One example system includes a vision sensor positioned to collect imagery depicting the cooktop and one or more processors implementing instructions to perform operations. The operations include obtaining a first frame of imagery and a second frame of imagery from the vision sensor. The first frame of imagery and the second frame of imagery respectively depict the cooktop. The operations include identifying a plurality of motion vectors based on the first and second frames of imagery. The operations include generating a histogram describing a characteristic of the plurality of motion vectors. The operations include calculating a dissimilarity score. The dissimilarity score describes a difference between the histogram and a pre-learned histogram. The pre-learned histogram describes the characteristic for imagery depicting boiling liquid. The operations include determining whether a boiling event is occurring at the cooktop based at least in part on the dissimilarity score.

18 Claims, 6 Drawing Sheets

SYSTEMS AND METHODS FOR BOIL DETECTION

FIELD OF THE INVENTION

The present disclosure relates generally to systems and methods for boil detection. More particularly, the present disclosure is directed to systems and methods for boil detection in which a computer vision algorithm is applied to imagery of a cooktop captured by a camera to detect a boiling event.

BACKGROUND OF THE INVENTION

One primary use of a cooktop appliance is to boil water or other liquids. For example, when preparing rice, pasta, or other dishes, it may be desirable to bring a pot of water to boil using high heat and then reduce the level of supplied heat once the water begins to boil. As another example, some dishes may require bringing a sauce to boil and then reducing heat to let the sauce simmer.

However, in certain instances, the user may be distracted or performing another task and, therefore, fail to notice that the water or other liquid has reached a boiling state. Failure to reduce the heat once the liquid has achieved the boiling state can cause a number of problems including, for example, overcooking of the dish, splatter of liquid onto the cooktop surface, or even complete evaporation of the liquid, a condition referred to as "boil-dry," which can potentially lead to ignition of a fire. Therefore, systems and methods for boil detection and alarming are desirable.

Certain existing systems have been proposed for performing boil detection. As an example, motion sensors can be used to detect motion at the cooktop. However, these systems suffer from significant problems with accuracy, as human motion (e.g. stirring) or rising steam trigger the sensor and leads to a false positive of a boiling event.

As another example, other existing systems may use temperature sensors to attempt to detect a boiling event. However, these systems can suffer from problems with accuracy and granularity, as well. For example, temperature sensors in a generally heated environment such as a cooktop may lead to significant numbers of errors.

Therefore, systems and methods for boil detection that provide improved accuracy are desirable.

BRIEF DESCRIPTION OF THE INVENTION

Additional aspects and advantages of the invention will be set forth in part in the following description, or may be apparent from the description, or may be learned through practice of the invention.

One aspect of the present disclosure is directed to a system for detecting a boiling event at a cooktop. The system includes a vision sensor positioned so as to collect imagery depicting the cooktop. The system includes one or more processors and one or more non-transitory computer-readable media storing instructions that, when executed by the one or more processors, cause the one or more processors to perform operations. The operations include obtaining a first frame of imagery and a second frame of imagery from the vision sensor. The first frame of imagery and the second frame of imagery respectively depict the cooktop. The operations include identifying a plurality of motion vectors based on the first and second frames of imagery. Each of the plurality of motion vectors describes a change in position of one or more pixels from the first frame of imagery to the second frame of imagery. The operations include generating a histogram describing a characteristic of the plurality of motion vectors. The operations include calculating a dissimilarity score. The dissimilarity score describes a difference between the histogram and a pre-learned histogram. The pre-learned histogram describes the characteristic for imagery depicting boiling liquid. The operations include determining whether a boiling event is occurring at the cooktop based at least in part on the dissimilarity score.

Another aspect of the present disclosure is directed to a method for detecting a boiling event at a cooktop. The method includes collecting, by a vision sensor, a plurality of frames comprising imagery depicting the cooktop. The method includes determining, by one or more computing devices, a plurality of motion vectors for each of the plurality of frames. Each motion vector for each frame describes a change in position of one or more pixels included in such frame with respect to a previous sequential frame of the plurality of frames. The method includes generating, by the one or more computing devices for each of the plurality of frames, one or more histograms describing the plurality of motion vectors determined for such frame. The method includes comparing, by the one or more computing devices for each of the plurality of frames, the one or more histograms generated for such frame with one or more pre-learned histograms. The method includes detecting, by the one or more computing devices, a boiling event at the cooktop based on the comparison of the one or more histograms generated for each frame with the one or more pre-learned histograms.

Another aspect of the present disclosure is directed to a non-transitory computer-readable medium storing instructions that, when executed by a processor, cause the processor to perform operations. The operations include obtaining a plurality of frames of imagery from a vision sensor. The plurality of frames of imagery respectively depict a cooktop. The plurality of frames of imagery form a plurality of pairs of consecutive frames. The operations include identifying a plurality of motion vectors for each pair of consecutive frames of imagery. The operations include generating, for each pair of consecutive frames of imagery, a histogram describing a characteristic of the plurality of motion vectors identified for such pair of consecutive frames. The operations include calculating, for each pair of consecutive frames of imagery, a dissimilarity score. The dissimilarity score describes a difference between the histogram generated for such pair of consecutive frames and a pre-learned histogram. The pre-learned histogram describes the characteristic for imagery depicting boiling liquid. The operations include determining whether a boiling event is occurring at the cooktop based at least in part on the dissimilarity scores respectively calculated for the plurality of pairs of consecutive frames.

These and other features, aspects and advantages of the present invention will become better understood with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended figures, in which.

DETAILED DESCRIPTION OF THE INVENTION

Figure 1:
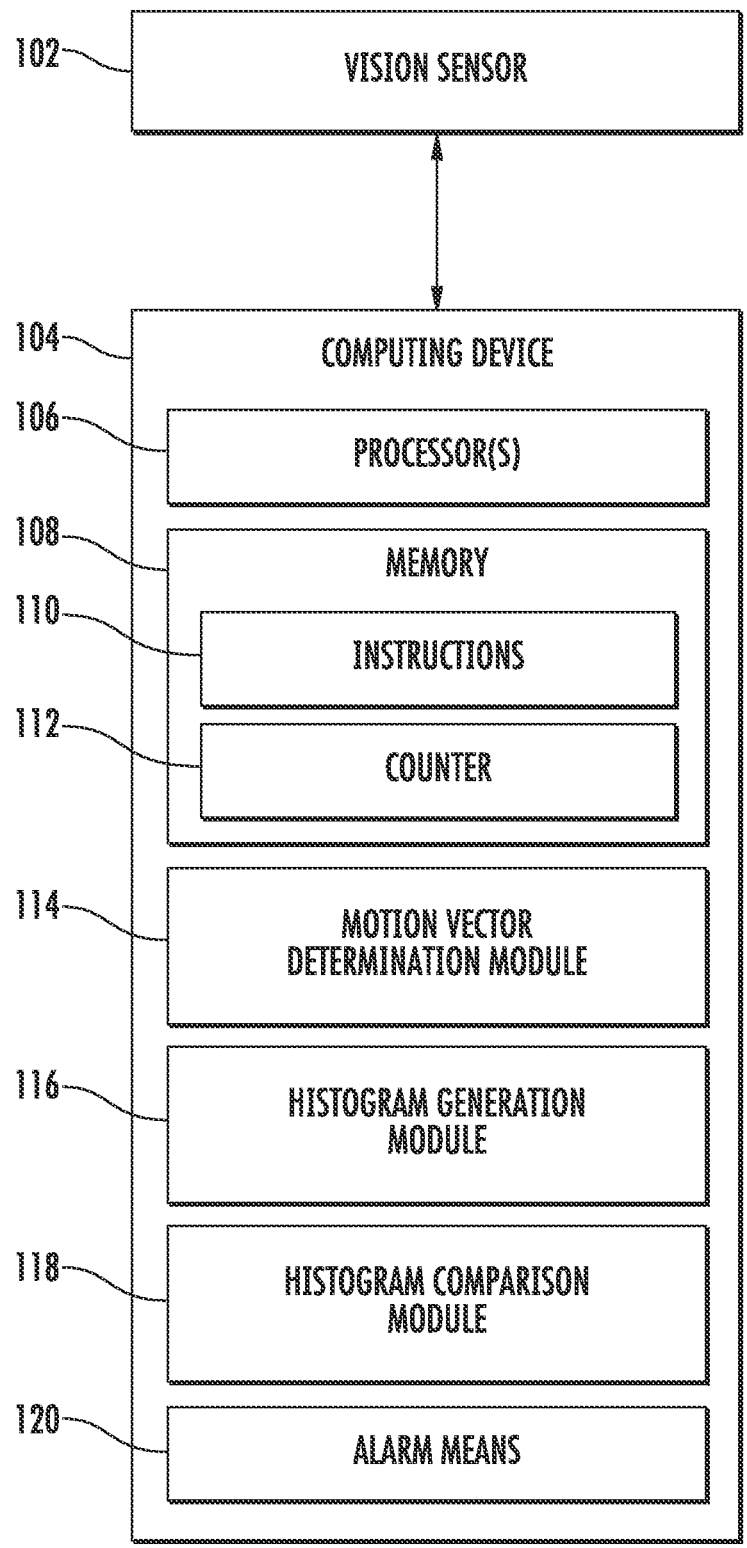
FIG. 1 depicts an example system according to an example embodiment of the present disclosure.

Reference now will be made in detail to embodiments of the invention, one or more examples of which are illustrated in the drawings. Each example is provided by way of explanation of the invention, not limitation of the invention. In fact, it will be apparent to those skilled in the art that various modifications and variations can be made in the present invention without departing from the scope or spirit of the invention. For instance, features illustrated or described as part of one embodiment can be used with another embodiment to yield a still further embodiment. Thus, it is intended that the present invention covers such modifications and variations as come within the scope of the appended claims and their equivalents.

With reference now to the FIGS., example embodiments of the present disclosure will be discussed in further detail. FIG. 1 depicts an example system 100 according to an example embodiment of the present disclosure.

System 100 can include a vision sensor 102 that can exchange data with a computing device 104. As an example, the vision sensor 102 can be any suitable camera for capturing imagery. For example, in some embodiments, the vision sensor 102 can be a wide-angle VGA resolution camera.

vision sensor 102 can be positioned so as to collect imagery depicting a cooktop. For example, vision sensor 102 can be secured to the underside of an over the range microwave or hood and pointed downwards so that the view of the vision sensor generally corresponds to the dimensions of the cooktop.

Vision sensor 102 can collect a plurality of frames of imagery. For example, in some embodiments, computing device 104 can operate vision sensor 102 to collect between 0.3 to 1 frames per second of a VGA resolution video stream. The frame rate can be modifiable by the computing device 104.

Computing device 104 can be any device that includes one or more processors 106 and a memory 108. As an example, in some embodiments, computing device 104 can be a single board computer (SBC). For example, the computing device 104 can be a single System-On-Chip (SOC). Further, the vision sensor 102 can also be located on the same single circuit board. However, any form of computing device 104 can be used to perform the present disclosure.

The processor(s) 106 can be any suitable processing device, such as a microprocessor, microcontroller, integrated circuit, or other suitable processing devices or combinations thereof.

The memory 108 can include any suitable storage media, including, but not limited to, non-transitory computer-readable media, RAM, ROM, hard drives, flash drives, accessible databases, or other memory devices. The memory 108 can store information accessible by processor(s) 106, including instructions 110 that can be executed by processor(s) 106 to perform aspects of the present disclosure.

Memory 108 can also include a counter 112 storing a counter value. In some embodiments, the counter 112 can be used to count a number of consecutive frames of imagery which the computing device 104 has determined depict a boiling event at the cooktop.

Computing device 104 can also include a number of modules to provide functionality or otherwise perform particular operations. It will be appreciated that the term "module" refers to computer logic utilized to provide desired functionality. Thus, a module can be implemented in hardware, application specific circuits, firmware and/or software controlling a general purpose processor. In one embodiment, modules are program code files stored on the storage device, loaded into memory and executed by a processor or can be provided from computer program products, for example computer executable instructions, that are stored in a tangible computer-readable storage medium such as RAM, hard disk or optical or magnetic media.

Computing device 104 can implement a motion vector determination module 114 to determine a plurality of motion vectors for each of a plurality of pairs of frames of imagery. For example, each of the plurality of motion vectors can describe a change in position of one or more pixels from a first frame of imagery to a second frame of imagery. In some embodiments, each motion vector can include a magnitude and an orientation. For example, the orientation can be expressed as an angle from 0 to 360.

In particular, in some embodiments, motion vector determination module 114 can be implemented to perform one or more motion estimation techniques to identify the plurality of motion vectors. As examples, motion vector determination module 114 can perform a block-matching technique, a phase correlation technique, a frequency domain technique, a pixel recursive technique, an optical flow technique (e.g. Lucas-Kanade or Horn-Schunck), corner detection, feature matching, patch matching, texture matching, or other techniques or statistical functions.

As another example, in some embodiments, processing performed by motion vector determination module 114 can be simplified by searching only along horizontal and/or vertical lines extending from each pixel in the earlier frame for matching pixels in the later frame. In such fashion, processing time and power requirements can be reduced to allow for an improved implementation speed or reduced product cost.

Computing device 104 can implement a histogram generation module 116 to generate one or more histograms for each of the plurality of pairs of frames of imagery. For example, each histogram can describe a characteristic of the plurality of motion vectors determined for each respective pair of frames. As examples, the histogram can describe a distribution of orientations associated with the plurality of motion vectors; a distribution of magnitudes associated with the plurality of motion vectors; a distribution of other variables; or distributions of various combinations of variables (e.g. both orientation and magnitude). The histograms may be embodied as stored data and are not necessarily represented or stored in a graphical or visual fashion. Further, the histograms can provide discrete intervals of data or may provide a continuous density function with kernel methods.

Computing device 104 can implement a histogram comparison module 118 to compare two or more histograms. For example, histogram comparison module 118 can be implemented to compare the one or more histograms generated by histogram generation module 116 with one or more pre-learned histograms stored in memory 108.

In particular, the one or more pre-learned histograms stored in memory 108 can respectively describe one or more characteristics of a plurality of motion vectors exhibited by frames of imagery depicting a boiling event. For example, in some embodiments, the pre-learned histograms can be generated through testing or analyzing imagery depicting a boiling event. In other embodiments, the pre-learned histograms can be approximations, such as for example, a histogram having a uniform distribution of orientations.

Histogram comparison module 118 can be implemented to perform one or more histogram comparison techniques to compare two or more histograms. As examples, histogram comparison module 118 can perform an earth mover's distance (EMD) technique, a bin-to-bin comparison technique, an L-1 distance technique, an L-2 distance technique, a Wasserstein metric technique, a Kolmogorov-Smirnov test, an f-divergence technique (e.g. Kullback-Leiber divergence or Hellinger distance), a total variation distance technique, an absolute difference value, or other histogram comparison techniques.

Furthermore, histogram comparison module 118 can provide a dissimilarity score for two histograms being compared. As an example, the dissimilarity score can correspond to one or more distance values that respectively result from one or more histogram comparison techniques. For example, the dissimilarity score can be a weighted sum of a plurality of distance values respectively obtained using a plurality of histogram comparison techniques. In some embodiments, a smaller dissimilarity score will be provided for pairs of histograms that exhibit a similar distribution while larger dissimilarity score will be provided for pairs of histograms that exhibit divergent distributions.

Alarm means 120 can be any suitable component or grouping of components for providing an alarm to a user upon detection of a boiling event. As an example, alarm means 120 can include one or more light emitting devices (e.g. LEDs) that illuminate or flash upon detection of the boiling event or one or more speakers for providing an audible alarm upon detection of the boiling event.

As another example, in some embodiments, alarm means 120 can include circuitry for communicating with the cooktop appliance over a local network to inform the cooktop appliance of the boiling event. In such instance, the cooktop appliance may respond by lowering the temperature setting for the burner associated with the boiling event.

As yet another example, in some embodiments, alarm means 120 can include circuitry for sending an SMS text message or other form of electronic message (e.g. electronic mail) to a mobile computing device of a user to notify the user of the detected boiling event.

Figure 2:
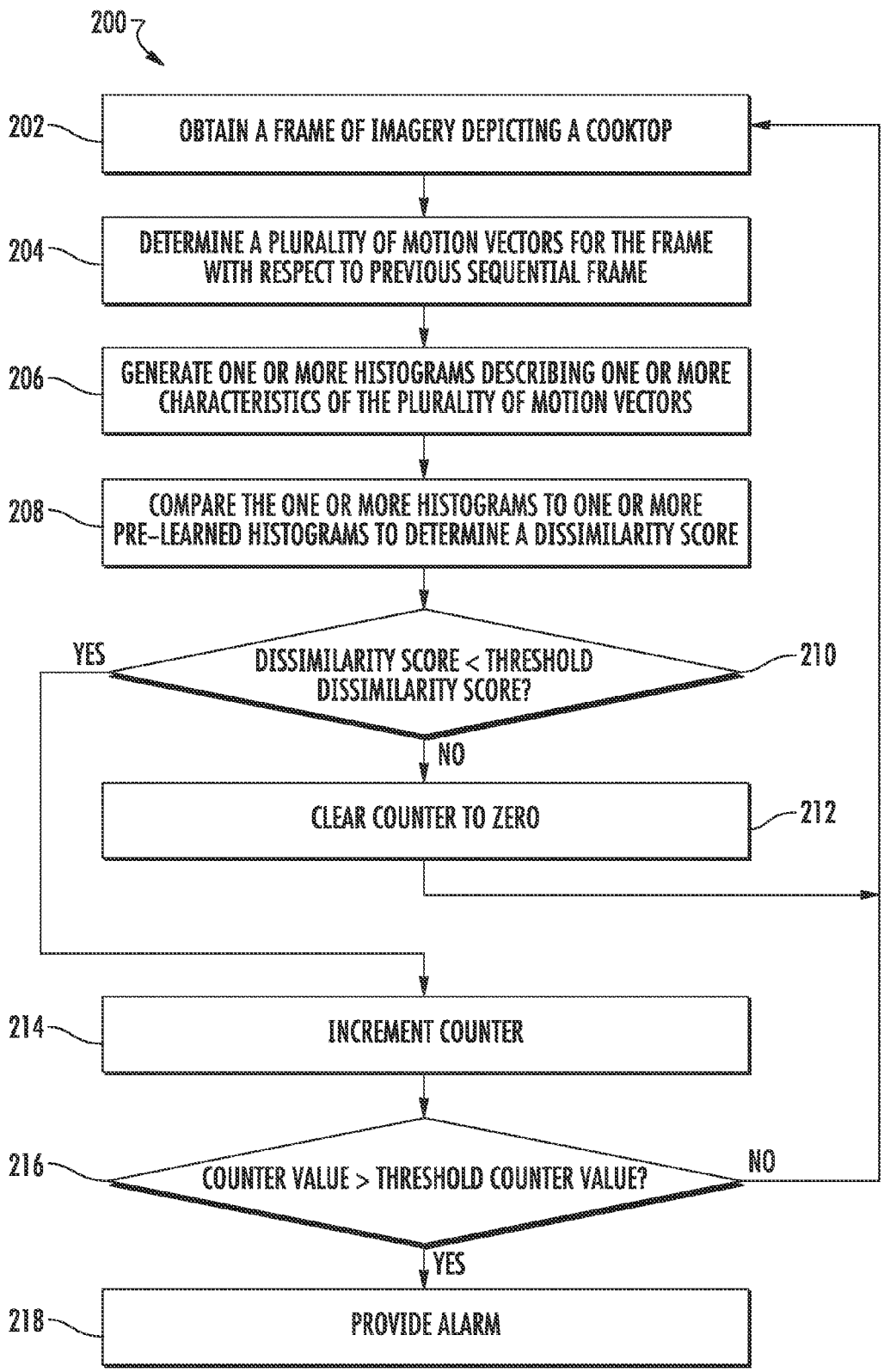
FIG. 2 depicts a flow chart of an example method according to an example embodiment of the present disclosure.

FIG. 2 depicts a flow chart of an example method (200) according to an example embodiment of the present disclosure. Although method (200) will be discussed with reference to system 100 of FIG. 1, method (200) can be performed by any suitable system. In addition, FIG. 2 depicts steps performed in a particular order for purposes of illustration and discussion. Those of ordinary skill in the art, using the disclosures provided herein, will understand that the various steps of method (200) can be omitted, adapted, and/or rearranged in various ways without departing from the scope of the present disclosure.

Figure 3:
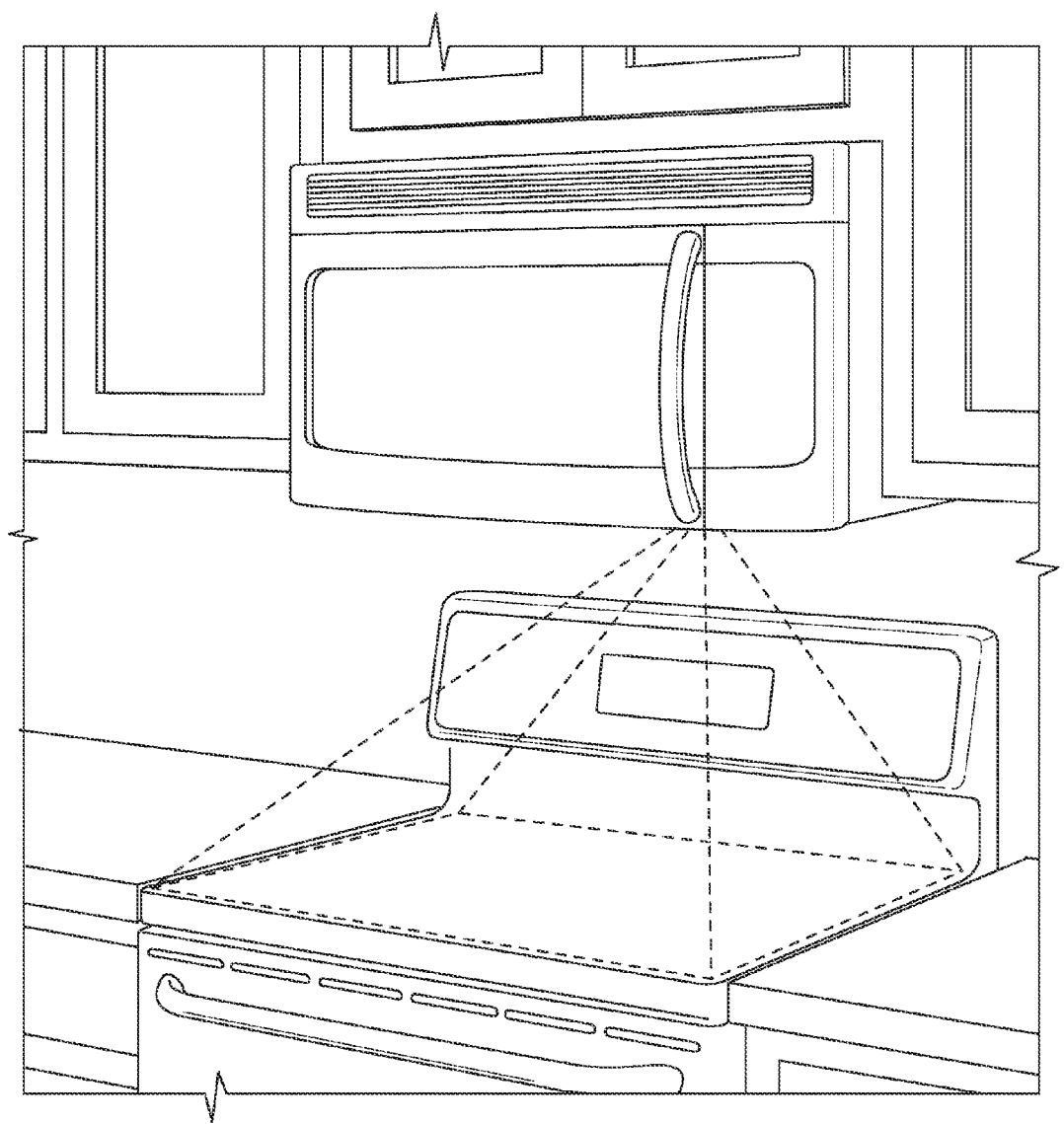
FIG. 3 depicts an example depiction of a vision sensor capturing imagery depicting a cooktop according to an example embodiment of the present disclosure.

At (202) a frame of imagery depicting a cooktop can be obtained. For example, computing device 104 can obtain a frame of imagery from vision sensor 102. As an example, FIG. 3 depicts an example depiction of a vision sensor capturing imagery depicting a cooktop according to an example embodiment of the present disclosure.

Referring again to FIG. 2, at (204) a plurality of motion vectors can be determined for the frame with respect to a previous sequential frame. For example, computing device 104 can implement motion vector determination module 114 to determine the plurality of motion vectors for the frame.

Figure 4:
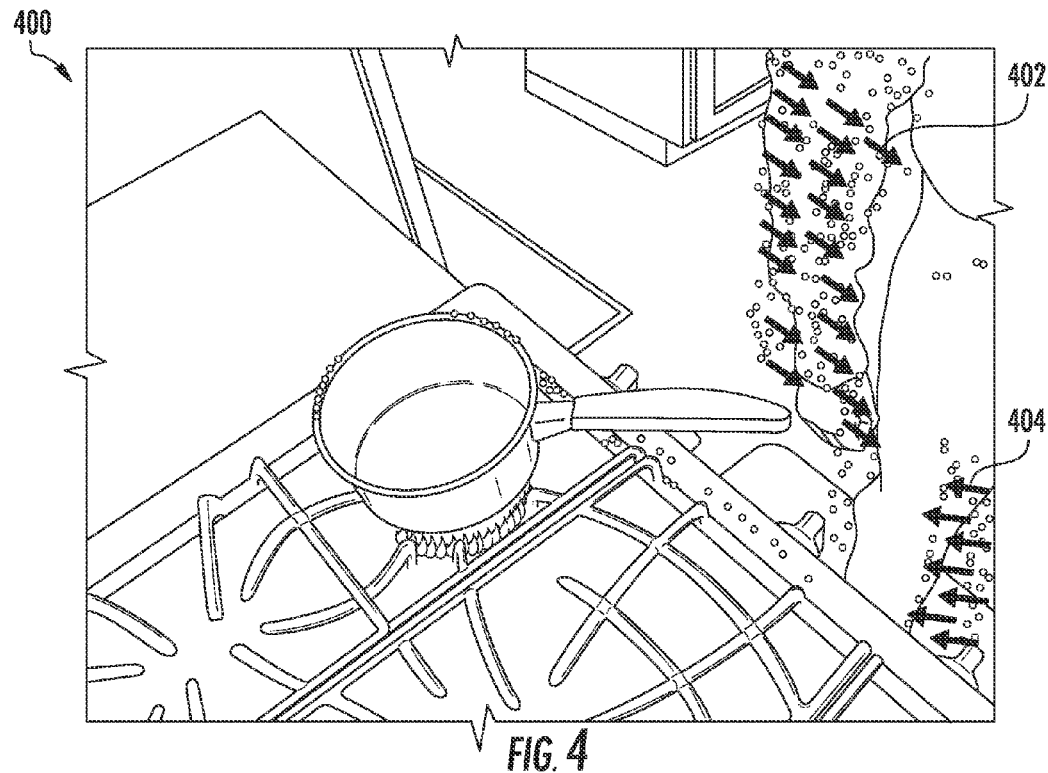
FIG. 4 depicts an example frame of imagery depicting a cooktop according to an example embodiments of the present disclosure.

As an example, FIG. 4 depicts an example frame 400 of imagery depicting a cooktop according to an example embodiment of the present disclosure. In particular, frame 400 depicts a pot of water that is not boiling and a human that is moving.

Furthermore, a plurality of motion vectors are superimposed graphically upon frame 400. For example, motion vector 402 shows motion of the human arm while motion vector 404 shows motion of the human leg. As can be seen from FIG. 4, the motion vectors showing human motion in frame 400 are generally relatively large in magnitude and consistent in orientation.

Figure 5:
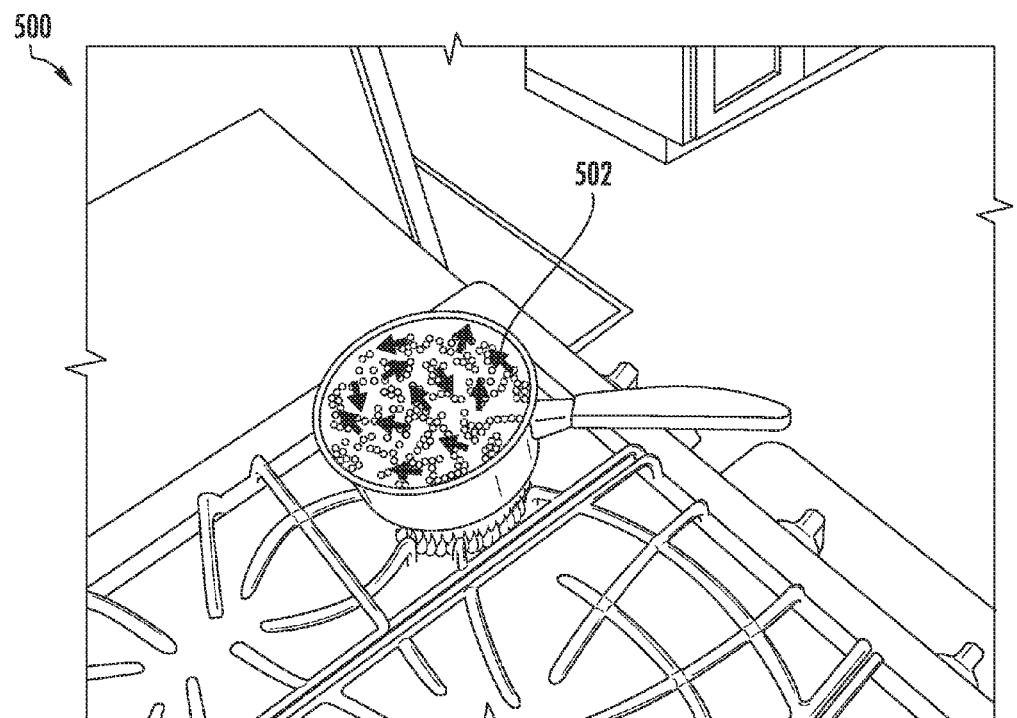
FIG. 5 depicts an example frame of imagery depicting a cooktop according to an example embodiments of the present disclosure.

As another example, FIG. 5 depicts an example frame 500 f imagery depicting a cooktop according to an example embodiment of the present disclosure. In particular, frame 500 depicts a pot of water that is boiling.

Furthermore, a plurality of motion vectors are superimposed graphically upon frame 500. For example, motion vector 502 shows motion captured by frame 500 that corresponds to the boiling water. As can be seen from FIG. 5, the motion vectors showing motion due to boiling water in frame 500 are generally relatively small in magnitude and randomized in orientation.

Referring again to FIG. 2, at (206) one or more histograms can be generated that describe one or more characteristics of the plurality of motion vectors determined at (204). For example, computing device 106 can implement histogram generation module 116 to generate the one or more histograms.

Figure 6:
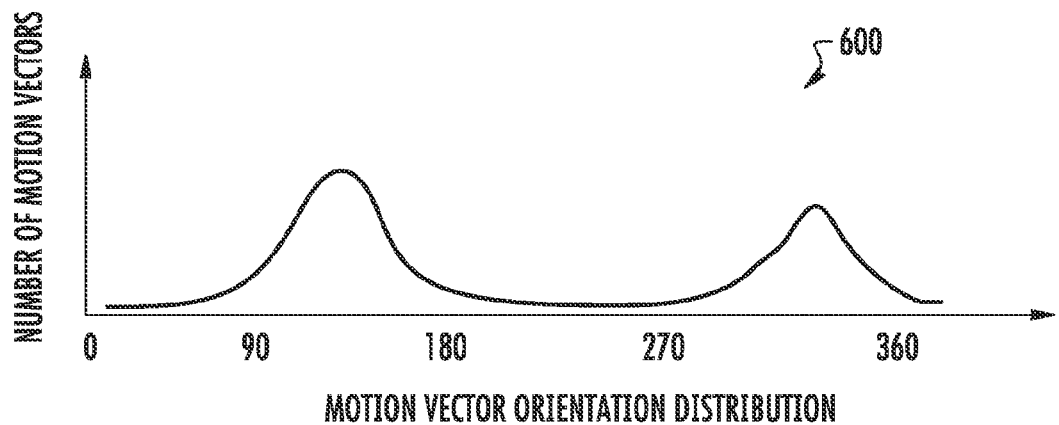
FIG. 6 depicts an example histogram according to an example embodiment of the present disclosure.

As an example, FIG. 6 depicts an example histogram 600 according to an example embodiment of the present disclosure. Histogram 600 describes a distribution of motion vector orientations corresponding to the plurality of motion vectors shown on frame 400 of FIG. 4, which depicts human motion. In particular, because the motion vectors for frame 400 are relatively consistent in orientation (e.g. showing the arm movement in a first direction and the leg movement in the second direction), the corresponding histogram 600 reflects a disproportionate number of motion vectors at two particular orientations.

Figure 7:
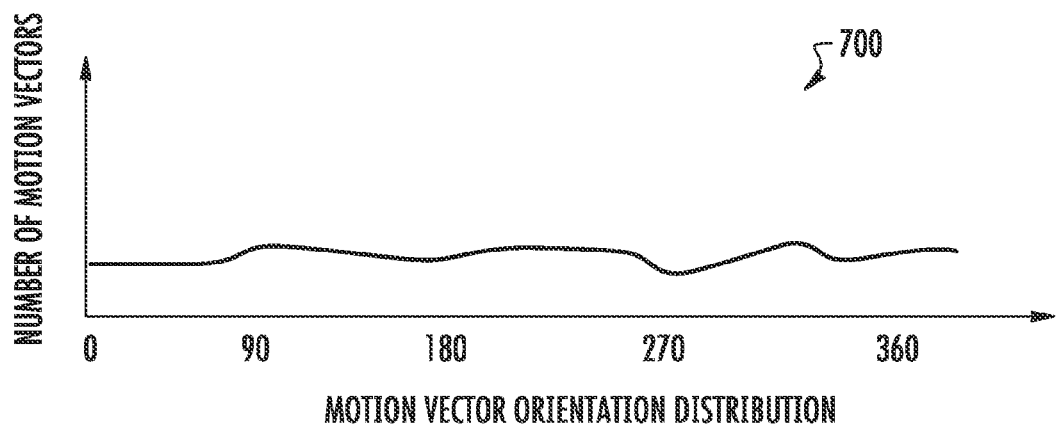
FIG. 7 depicts an example histogram according to an example embodiment of the present disclosure.

As another example, FIG. 7 depicts an example histogram 700 according to an example embodiment of the present disclosure. Histogram 700 describes a distribution of motion vector orientations corresponding to the plurality of motion vectors shown on frame 500 of FIG. 5, which depicts a boiling event. In particular, because the motion vectors for frame 500 are relatively randomized in orientation, the corresponding histogram 700 reflects a relatively uniform distribution of motion vector orientations.

Thus, if a histogram of motion vector orientations shows a significant number of motion vectors clustered about particular orientations, then it may indicate that the corresponding frames of imagery depict human motion. However, if the histogram of motion vector orientations shows a significant number of motion vectors distributed in a relatively uniform manner, then it may indicate that the corresponding frames of imagery depict a boiling event.

Figure 8:
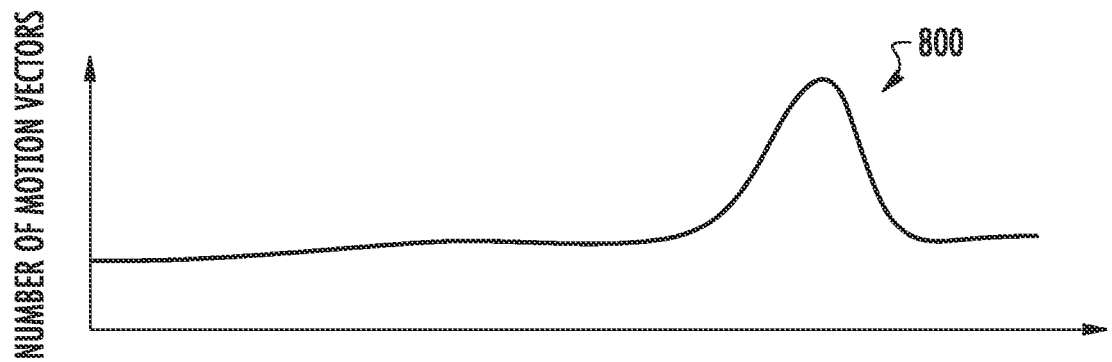
FIG. 8 depicts an example histogram according to an example embodiment of the present disclosure.

As another example, FIG. 8 depicts an example histogram 800 according to an example embodiment of the present disclosure. Histogram 800 describes a distribution of motion vector magnitudes corresponding to the plurality of motion vectors shown on frame 400 of FIG. 4, which depicts human motion. In particular, because the motion vectors for frame 400 exhibit relatively large magnitudes, the corresponding histogram 800 reflects a disproportionate number of motion vectors at a particular magnitude having a relatively large value.

Figure 9:
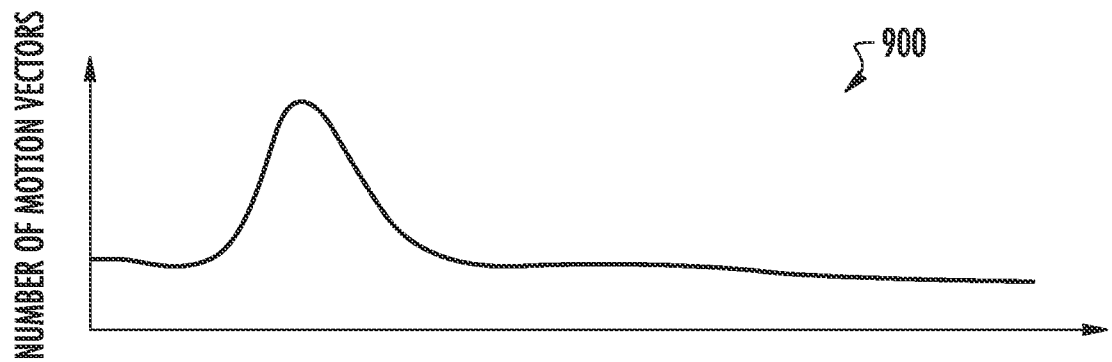
FIG. 9 depicts an example histogram according to an example embodiment of the present disclosure.

As another example, FIG. 9 depicts an example histogram 900 according to an example embodiment of the present disclosure. Histogram 900 describes a distribution of motion vector magnitudes corresponding to the plurality of motion vectors shown on frame 500 of FIG. 5, which depicts a boiling event. In particular, because the motion vectors for frame 500 exhibit relatively small magnitudes, the corresponding histogram 900 reflects a disproportionate number of motion vectors at a particular magnitude having a relatively small value.

Thus, if an histogram of motion vector orientations shows a significant number of motion vectors clustered about a particular magnitude having a relatively large value, then it may indicate that the corresponding frames of imagery depict human motion. However, if the histogram of motion vector orientations shows a significant number of motion vectors clustered about a particular magnitude having a relatively small value, then it may indicate that the corresponding frames of imagery depict a boiling event.

Referring again to FIG. 2, at (208) the one or more histograms generated at (206) can be respectively compared to one or more pre-learned histograms to determine a dissimilarity score. For example, computing device 104 can implement histogram comparison module 118 to compare the histograms.

In particular, the one or more pre-learned histograms stored in memory 108 can respectively describe one or more characteristics of a plurality of motion vectors exhibited by frames of imagery depicting a boiling event. For example, in some embodiments, the pre-learned histograms can be generated through testing or analyzing imagery depicting a boiling event. In other embodiments, the pre-learned histograms can be approximations, such as for example, a histogram having a uniform distribution of orientations.

The dissimilarity score can correspond to one or more distance values that respectively result from one or more histogram comparison techniques. For example, the dissimilarity score can be a weighted sum of a plurality of distance values respectively obtained using a plurality of histogram comparison techniques. In some embodiments, a smaller dissimilarity score will be provided for pairs of histograms that exhibit a similar distribution while a larger dissimilarity score will be provided for pairs of histograms that exhibit divergent distributions.

At (210) it can be determined whether the dissimilarity score determined at (208) is less than a threshold dissimilarity score.

If it is determined at (210) that the dissimilarity score is not less than the threshold dissimilarity score, then method (200) can proceed to (212) and clear a counter to zero. After (212), method (200) can return to (202) and obtain an additional frame of imagery depicting the cooktop. In such fashion, consecutive frames can be analyzed in an iterative fashion to identify a boiling event. However, the frames used to determine motion vectors at (204) are not necessarily consecutive in nature. As an example, one frame can be obtained for analysis each second event even though the vision sensor is collecting frames at a higher rate.

Returning to (210), if it is determined that the dissimilarity score is less than the threshold dissimilarity score, then method (200) can proceed to (214) and increment the counter. For example, computing device 104 can increment the counter 112.

At (216) it can be determined whether the counter value is greater than a threshold counter value. If it is determined at (216) that the counter value is not greater than the threshold value, then method (200) can return to (202) and obtain an additional frame of imagery depicting the cooktop.

However, if it is determined at (216) that the counter value is greater than the threshold value, then method (200) can proceed to (218) and provide an alarm. In such fashion, a threshold number of consecutive frames of imagery must be classified as depicting a boiling event prior to providing the alarm. The threshold counter value can be adjustable to adjust for detection confidence.

Providing the alarm at (218) can include flashing a lighting device, sounding a sound with a speaker, or performing various communications methods or protocols to communicate with a mobile device of the user or the cooktop itself.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

What is claimed is:

1. A system for detecting a boiling event at a cooktop, the system comprising:
   a vision sensor positioned so as to collect imagery depicting the cooktop;
   one or more processors; and
   one or more non-transitory computer-readable media storing instructions that, when executed by the one or more processors, cause the one or more processors to perform operations comprising:
      obtaining a first frame of imagery and a second frame of imagery from the vision sensor, wherein the first frame of imagery and the second frame of imagery respectively depict the cooktop;
      identifying a first plurality of motion vectors based on the first and second frames of imagery, wherein each of the first plurality of motion vectors describes a change in position of one or more pixels from the first frame of imagery to the second frame of imagery;
      generating a motion vector orientation histogram that describes a first distribution of orientations associated with the first plurality of motion vectors;
      calculating a first dissimilarity score for the motion vector orientation histogram, wherein the first dissimilarity score describes a first difference between the motion vector orientation histogram and a first pre-learned histogram, wherein the first pre-learned histogram describes a second distribution of orientations associated with a second plurality of motion vectors identified from imagery depicting boiling liquid, and wherein the second distribution of orientations indicates that the second plurality of motion vectors identified from the imagery depicting the boiling liquid have orientations distributed in a relatively uniform manner;

generating a motion vector magnitude histogram that describes a first distribution of magnitudes associated with the first plurality of motion vectors;

calculating a second dissimilarity score for the motion vector magnitude histogram, wherein the second dissimilarity score describes a second difference between the motion vector magnitude histogram and a second pre-learned histogram, wherein the second pre-learned histogram describes a second distribution of magnitudes associated with the second plurality of motion vectors identified from the imagery depicting the boiling liquid, and wherein the second distribution of magnitudes indicates that a relatively large number of the second plurality of motion vectors identified from the imagery depicting the boiling liquid are clustered about a particular magnitude having a relatively small value; and determining whether a boiling event is occurring at the cooktop based at least in part on the first dissimilarity score and based at least in part on the second dissimilarity score.

2. The system of claim 1, wherein determining whether a boiling event is occurring at the cooktop based at least in part on the first dissimilarity score and based at least in part on the second dissimilarity score comprises:

incrementing a counter value when each of the first dissimilarity score and the second dissimilarity score is less than a respective threshold dissimilarity value; and detecting the boiling event at the cooktop when the counter value exceeds a threshold counter value.

3. The system of claim 2, wherein determining whether a boiling event is occurring at the cooktop based at least in part on the first dissimilarity score and based at least in part on the second dissimilarity score further comprises clearing the counter value to zero when each of the first dissimilarity score and the second dissimilarity is greater than the respective threshold dissimilarity value.

4. The system of claim 1, wherein the vision sensor comprises a wide angle VGA resolution camera.

5. The system of claim 1, wherein the one or more processors and the one or more non-transitory computer-readable media comprise a single System-On-Chip.

6. The system of claim 1, wherein the first pre-learned histogram and the second pre-learned histogram are stored in the one or more non-transitory computer-readable media.

7. A method for detecting a boiling event at a cooktop, the method comprising:

collecting, by a vision sensor, a plurality of frames comprising imagery depicting the cooktop;

determining, by one or more computing devices, a plurality of motion vectors for each of the plurality of frames, wherein each motion vector for each frame describes a change in position of one or more pixels included in such frame with respect to a previous sequential frame of the plurality of frames;

generating, by the one or more computing devices, a motion vector orientation histogram for each of the plurality of frames, wherein the motion vector orientation histogram for each frame describes a first distribution of orientations associated with the plurality of motion vectors determined for such frame;

calculating, by the one or more computing devices a first dissimilarity score for the motion vector orientation histogram of each frame, wherein the first dissimilarity score for each frame describes a first difference between the motion vector orientation histogram for such frame and a first pre-learned histogram, wherein the first pre-learned histogram describes a second distribution of orientation associated with a second plurality of motion vectors identified from imagery depicting a boiling event, and wherein the second distribution of orientations indicates that the second plurality of motion vectors identified from the imagery depicting the event have orientations distributed in a uniform manner;

generating, by the one or more computing devices, a motion vector magnitude histogram for each of the plurality of frames, wherein the motion vector magnitude histogram for each frame describes a first distribution of magnitudes associated with the plurality of motion vectors determined for such frame;

calculating, by the one or more computing devices, a second dissimilarity score for the motion vector magnitude histogram of each frame, wherein the second dissimilarity score for each frame and a second difference between the motion vector magnitude histogram for such frame and a second pre-learned histogram, wherein the second pre-learned histogram describes a second distribution of magnitudes associated with the second plurality of motion vectors identified from the imagery depicting the boiling event, and wherein the second distribution of magnitudes indicates that a number of the second plurality of motion vectors identified from the imagery depicting the boiling event are clustered about a particular magnitude having a small value; and detecting, by the one or more computing devices, a boiling event at the cooktop based on the first dissimilarity score and the second dissimilarity score calculated for at least one of the plurality of frames.

8. The method of claim 7, wherein detecting, by the one or more computing devices, the boiling event at the cooktop based at least in part on the first dissimilarity score and the second dissimilarity score for at least one the plurality of frames comprises:

determining, by the one or more computing devices, a number of consecutive frames for which the dissimilarity score is less than a threshold similarity value; and when the number of consecutive frames exceeds a threshold counter value, detecting, by the one or more computing devices, the boiling event.

9. The method of claim 7, further comprising providing an alarm when the boiling event is detected.

10. A non-transitory computer-readable medium storing instructions that, when executed by a processor, cause the processor to perform operations, the operations comprising:

obtaining a plurality of frames of imagery from a vision sensor, wherein the plurality of frames of imagery respectively depict a cooktop, and wherein the plurality of frames of imagery form a plurality of pairs of consecutive frames;

identifying a plurality of motion vectors for each pair of consecutive frames of imagery;

generating, for each pair of consecutive frames of imagery, a motion vector orientation histogram that describes a first distribution of orientations associated with the plurality of motion vectors determined for such pair of consecutive frames;

calculating, for each pair of consecutive frames of imagery, a first dissimilarity score for the corresponding motion vector orientation histogram, wherein the first dissimilarity score for each consecutive pair of frames describes a first difference between the motion vector orientation histogram for such pair of consecutive frames and a first pre-learned histogram, wherein the first pre-learned histogram describes a second distribution of orientations associated with a second plurality of motion vectors identified from imagery depicting a boiling event, and wherein the second distribution of orientations indicates that the second plurality of motion vectors identified from the imagery depicting the boiling event have orientations distributed in a uniform manner;

generating, for each pair of consecutive frames of imagery, a motion vector magnitude histogram, wherein the motion vector magnitude histogram for each pair of consecutive frames describes a first distribution of magnitudes associated with the plurality of motion vectors determined for such pair of consecutive frames;

calculating, for each pair of consecutive frames of imagery, a second dissimilarity score for the corresponding motion vector magnitude histogram, wherein the second dissimilarity score for each pair of consecutive frames describes a second difference between the motion vector magnitude histogram for such pair of consecutive frames and a second pre-learned histogram, wherein the second pre-learned histogram describes a second distribution of magnitudes associated with the second plurality of motion vectors identified from the imagery depicting the boiling event, and wherein the second distribution of magnitudes indicates that a number of the second plurality of motion vectors identified from the imagery depicting the boiling event are clustered about a particular magnitude having a small value; and determining whether a boiling event is occurring at the cooktop based at least in part on the dissimilarity scores respectively calculated for the plurality of pairs of consecutive frames.

11. The non-transitory computer-readable medium of claim 10, wherein determining whether a boiling event is occurring at the cooktop based at least in part on the dissimilarity scores respectively calculated for the plurality of pairs of consecutive frames comprises:

determining a number of consecutive pairs for Which both the first dissimilarity score and the second dissimilarity score are less than a respective threshold similarity value; and detecting the boiling event when the number of consecutive pairs exceeds a threshold counter value.

12. The system of claim 1, wherein the vision sensor captures frames of images at between 0.3 to 1 frames per second.

13. The system of claim 5, wherein the single System-On-Chip and the vision sensor are located on a same single circuit board.

14. The system of claim 1, wherein at least one of the motion vector orientation histogram and the motion vector magnitude histogram provides a continuous density function with kernel methods.

15. The system of claim 1, wherein calculating the first dissimilarity score comprises performing at least one of an earth mover's distance (EMD) technique, a bin-to-bin comparison technique, an L-1 distance technique, an L-2 distance technique, a Wasserstein metric technique, a Kolmogorov-Smirnov test, an f-divergence technique, a total variation distance technique, and an absolute difference value technique.

16. The system of claim 1, wherein at least one of the first dissimilarity score and the second dissimilarity score comprises a weighted sum of a plurality of distance values respectively obtained using a plurality of histogram comparison techniques.

17. The method of claim 9, wherein providing an alarm when the boiling event is detected comprises communicating with a mobile device of a user.

18. The method of claim 9, wherein providing an alarm when the boiling event is detected comprises communicating with the cooktop.

* * * * *